United States Patent Office 3,461,036
Patented Aug. 12, 1969

3,461,036
TEST COMPOSITION, DEVICE AND METHOD FOR DETECTING UREA IN AQUEOUS FLUIDS
Edward K. Harvill, deceased, late of Elkhart, Ind., by Jeanne T. Harvill, Elkhart, Ind., sole heir, legatee and devisee, and Elsie J. Shrawder, Elkhart, Ind., assignors to Miles Laboratories, Inc., Elkhart, Ind., a corporation of Indiana
No Drawing. Continuation-in-part of application Ser. No. 383,996, July 20, 1964. This application June 5, 1967, Ser. No. 643,735
Int. Cl. C12k 1/04
U.S. Cl. 195—103.5    14 Claims

ABSTRACT OF THE DISCLOSURE

Improved test composition, device and method for detecting urea in aqueous fluids comprising urease, a pH indicator and an ammonium-ion producing buffer for controlling the pH of the test composition. The test composition is preferably incorporated with a carrier member such as bibulous filter paper.

CROSS REFERENCES TO RELATED APPLICATION

This is a continuation-in-part application based on copending U.S. application Ser. No. 383,996 filed on July 20, 1964 and now abandoned.

BACKGROUND OF THE INVENTION

A means for the accurate determination of urea in fluids of great importance not only in the early detection of physiological disorders by estimating the urea content of body fluids, but also in industrial process fluids where the urea concentration must be controlled within certain limits.

For example, a urea detecting means is extremely useful to an individual with a known kidney dysfunction who must control his diet or otherwise regulate his protein metabolism and must frequently be guided in this regard by a regular check on the concentration of his blood urea. But beyond its usefulness in regular testing in known kidney dysfunction by both patients and physicians, a urea indicator can only be used efficiently in routine urea analyses of body fluids in hospitals and physicians' offices.

In practice, the concentration of urea in blood, for example, is normally expressed in terms of blood urea nitrogen (BUN). This BUN value represents the amount of nitrogen present as urea and is approximately one-half of the total urea value. When either the urea or nitrogen value has been determined, the other value can be calculated therefrom.

The normal range of BUN values in individuals varies between 5–20 mg. percent. No significance is ordinarily attached to the lower values. However, elevations in BUN values generally indicate the presence of an abnormal condition. The most common cause of increased blood urea nitrogen is inadequate excretion, usually due to a kidney disease or urinary obstruction. For example, in acute nephritis the BUN level may vary from 25 mg. percent to as high as 160 mg. percent. Elevated urea retention also occurs with extensive parechymatous destruction of kidney tissue, as in pyelonephritis, advanced nephrosclerosis, renal tuberculosis, renal cortical necrosis, renal malignancy, renal suppuration or chronic gout. Although BUN values may rise to as high as 400 mg. percent, they usually do not exceed 200 mg. percent.

Moreover, the industrial area, urea is an important addition to process fluids such as plating baths, and a quick means to determine the concentration of urea therein is of great value. Urea itself is used as a fertilizer and a quick means for assaying this material is important as a control measure in its production and use.

Such means for the determination of urea fluids, whether the fluids be industrial or physiological, is of greatest value if the test method is conveniently rapid, reliable and simple enough for the technician to learn with ease. Moreover, in the case of medical diagnosis, the method must be accurate enough to serve the clinician and sensitive enough to reflect variations in the patient's condition.

DESCRIPTION OF THE PRIOR ART

Procedures for the determination of urea in fluids are well known in analytical chemistry. One such procedure utilizes chemical hydrolysis and requires special apparatus not always available in a routine laboratory. Another procedure employs a direct colorimetric reaction of urea in a protein-free filtrate with an organic reagent such as diacetyl monoxime. Still another involves a test which depends on the action of the enzyme urease to convert urea to an ammonium salt which is measured by titration or nesslerization. These prior procedures have the disadvantage that they all require a considerable amount of skill and familiarity with complicated laboratory techniques.

More recently, a fair sensitive enzymatic type test composition for the colorimetric determination of urea in fluids has been developed which has greatly simplified these determinations. This particular composition, which, in one of its more particular embodiments comprises a bibulous strip impregnated with active ingredients, is capable of producing a color change when contacted with a fluid containing urea. This method, diclosed in U.S. Patent No. 3,145,086 to A. H. Free and G. D. Lower, relates to compositions containing urease, a pH indicator, and specific molarity buffers such as citric acid/sodium citrate combinations. Upon contacting a fluid containing urea, the urease catalyzes the hydrolysis of the urea to ammonium carbonate which causes an alkaline condition to effect a color change in the indicator material. The buffer systems disclosed are such, however, that the method requires several separate test compositions to quantitate over a range of urea concentrations, or at the very least, the fluid being analyzed must be diluted or condensed for the particular test composition being utilized.

OBJECTS OF THE PRESENT INVENTION

It is a primary object of this invention to provide an improved colorimetric detecting means which possesses high specificity and sensitivity for determining urea in fluids over a range of concentrations using a single test composition.

Another object of this invention is to provide a colorimetric type test composition which is capable of detecting urea when the quantity of fluid available is limited.

SUMMARY OF THE INVENTION

The composition of this invention specifically accomplishes these objects by providing a single test composition which, in addition to being simple, rapid and extremely sensitive, is capable of detecting urea over a range of concentrations.

This invention comprises a unique combination of an enzyme sytsem, a chromogenic indicator, and a novel buffer system for providing the system at an optimum pH environment. The components of the composition cooperate in a manner such that when the enzyme system acts upon urea present in a fluid test, the indicator system undergoes a color change which accurately reflects the concentration of urea present in said fluid over a range of concentrations.

The basic enzymatic reaction underlying this invention is known, especially in the instance where the system contains urease. Urease catalyzes the hydrolysis of urea to produce principally ammonia and carbon dioxide, and/or ionized species thereof, depending upon the prevailing pH conditions of the enzyme reaction system. This enzymatic hydrolysis of urea can be simply represented by the following reaction sequence:

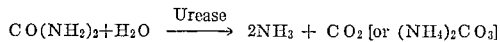

A product of this hydrolysis can be determined by means of an indicator system. For example, when the indicator system includes a pH indicator comprising a dye that is color sensitive to changes in pH, contact of said system with a product of this hydrolysis produces a color change in said dye which can be represented by the following reaction sequence:

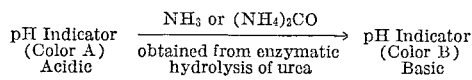

In order to ensure maximum urea sensitivity while at the same time effecting the desired degree of pH control, a buffer capable of producing ammonium ions is used in the compositions of this invention. In using this ammonium ion producing buffer, it has been found that a relatively small amount of ammonium salt, released by the enzymatic hydrolysis of urea, produces, or at least allows, a relatively large change in the pH of the composition. The result of such a phenomenon is that the composition, as will be discussed hereinbelow, is sensitive to small incremental changes in urea concentration. If the buffer utilized is incapable of producing ammonium ions, the composition will possess relatively poor urea sensitivity.

For example, a test composition which contains a conventional buffer, such as sodium citrate, in addition to urease, and a pH indicator such as bromthymol blue is capable of detecting urea changes in increments of about 50 mg. percent. In other words there must be a urea increase or decrease of about 50 mg. percent before the composition is capable of detecting a change. However, when a buffer capable of producing ammonium ions is used in accordance with this invention, incremental urea changes of 10 mg. percent and less can be detected. This is an improvement in sensitivity of about 500% or more.

In the present invention, the ammonium ion producing buffer is utilized to provide the test composition during use with an optimum pH range for both the tautometric activity of the indicator material and the enzymatic activity of the urease. In regard to the indicator material, the pH of the system is preferably initially set in a range between the midpoint of the transition interval of the indicator and a point adjacent to and on the acid side of this transition interval. The transition interval is defined as that pH range over which an indicator will exhibit a color change. For example, for bromthymol blue the transition interval lies between pH 6.0 and 7.6. Therefore, the midpoint of the transition interval of bromthymol blue is 6.8. In this illustration a pH adjacent to the transition interval of bromthymol blue and on the acid side thereof would be a pH of slightly below 6.0. Although the above noted range is preferable, the pH of the system may initially be set to any point within the transition interval of the indicator whereby an increase in pH would cause a color change. Such an embodiment, however, utilizes a smaller proportion of the transition interval of the indicator material and consequently makes quantitation over a broad range of urea concentrations more difficult.

The second consideration involved in selecting the optimum pH for the test method resides in the activity of urease under various pH conditions. In this regard it has been found that the optimum pH for urease depends on the particular buffer used, concentration of substrate, ionic strength, and so forth. Generally, however, it can be stated that although urease is active over a relatively broad pH range, it is preferable to utilize a buffer having a pH of from about pH 5 to about pH 9.

In practice, because of the impracticalities involved in measuring pH in a dry test system such as when the present test composition is incorporated with a carrier member or when such system is in use, as used herein the above noted pH parameters apply to the test composition solution used to prepare the composition or device.

DESCRIPTION OF THE PREFERRED EMBODIMENTS

In the present test composition utilizing an ammonium ion producing buffer there are a variety of compounds which may be used to buffer the composition to the proper pH. These ammonium ion producing buffers may be generically classified as ammonium salt forming nitrogen compounds and include the ammonium salts of weak organic and inorganic acids as well as amines and amine salts of such acids. Moreover, the compound must be a solid or at least a high boiling point liquid at room temperature. Examples of such buffers include ammonium citrate, ammonium lactate, ammonium oxalate, ammonium benzoate, ammonium acetate, ammonium salicylate, ammonium stearate, ammonium propionate, ammonium butyrate, ammonium phosphate, tris(hydroxymethyl)aminomethane (TRIS), 2-amino-2-methyl-1,3-propanediol, imidazole, 4-aminopyridine, 2-amino-2-methyl-1-propanol, hexamethylenediamine, substituted imidazoles, and acid salts thereof, and the like as well as mixtures of two or more of such buffers.

It has been found that tris(hydroxymethyl)aminomethane (TRIS) and its acid salts are preferable buffers for use in the present invention.

The amount or proportion of buffer used in the present test composition depends upon the buffering capacity of the particular substance selected and is well within the experimental purview of one skilled in the art of making and using chemical test systems.

Although a wide variety of pH indicators may be used in the present invention, considering the hereinabove noted pH parameters, the preferable indicators are those which have a transition interval within the optimum pH range for urease activity, i.e., pH 5 to pH 9. Exemplary of the indicators which may be used are bromthymol blue, bromcresol purple, dichlorosulphonphthalein, 6,8-dinitro-2,4 - quinazolinedione, alizarin, 2-(2,4-dinitrophenylazo)-1-naphthol 3,6-disulfonic acid and the like.

The compositions of this invention can be incorporated into various forms of test devices. In a preferred embodiment, bibulous paper strips are impregnated with a composition of this invention. In use, the resulting test device is contacted with a fluid to be tested and the product of the enzymatic reaction, if any, is determined colorimetrically. When the impregnated bibulous strip is contacted with a drop of the fluid being tested, the enzyme system having urease activity catalyzes the hydrolysis of the urea present in the fluid with the resulting formation of ammonia, carbon dioxide and possibly other reaction products. The quantity of urea hydrolyzed will cause a certain increment of pH increase which, in turn, causes a color change in the indicator. A correlation between color change and urea concentration can be made to provide a highly sensitive quantitative determination of urea. For example, when bromthymol blue is used in the composition of this invention, the various green hues between yellow and blue (the color change exhibited by bromthymol blue) can be correlated to correspond to different urea levels, thereby giving a clear visible index of the concentration of urea in the blood.

Although the ingredients comprising the composition of this invention are preferably impregnated into a bibulous carrier such as paper, this invention can also be used as a liquid system. A convenient liquid system can be prepared by lyophilizing the composition and then reconstituting with the fluid to be tested. If desired, this invention can also be used in the form of tablets, pellets, powders, and the like.

If desired, various additives may also be incorporated into the composition of this invention as protective, thickening or wetting agents. For example, thickening agents such as gelatin or wetting agents such as polyvinyl alcohols and polyethylene glycols can be used. A polyethylene glycol such as "Carbowax 4000" is particularly useful. Protective agents in the form of polymeric films can also be used to enhance the quality of the diagnostic composition of this invention when used with certain forms of test devices, for example, such as bibulous strips. Inert dyes to impart a uniform color background may also be used.

A semi-permeable polymeric film, for example ethyl cellulose, can be used as a dialyzing membrane to keep the larger molecules present in the fluid being tested, such as hemoglobin in blood, out of contact with the diagnostic composition while at the same time permitting the remaining portions of the fluid, including any urea present, to pass through and contact the test compositions. As a result, staining of the test composition by the hemoglobin in whole blood and the masking red color resulting from hemoglobin are avoided. The aforementioned large molecules can be readily washed or wiped off the polymeric film to permit observation of any resulting color change in the indicator. Further, the polymeric film protects the diagnostic composition from decomposition. Although ethyl cellulose is the preferred polymer, other semi-permeable film forming polymeric materials can be used if desired.

This invention is illustrated in greater detail in, but is not limited by the following examples:

EXAMPLE I

The composition is formulated as follows:

| | |
|---|---|
| Gelatin _____g__ | 0.5 |
| Urease _____g__ | 0.5 |
| Acetamide _____g__ | 1.0 |
| 4% "Carbowax 4000" (polyethylene glycol) __ml__ | 11.5 |
| 0.1 M ammonium citrate buffer (dibasic) ____ml__ | 2.5 |
| 1.6% aqueous solution bromthymol blue ____ml__ | 3.8 |

The gelatin was added to 11.5 ml. of water and heated until completely dissolved. The remaining ingredients were combined and then mixed with the solution of gelatin until a clear solution was obtained. The temperature of the final solution was approximately 30° C. The solution pH was then adjusted to a pH of about 6.5 by the addition of small quantities of dilute sodium hydroxide. Paper strips measuring 2 inches by ¼ inch were then dipped in the solution and dried at a temperature of 85% C. The dried strips were then coated with a semi-permeable polymeric film by dipping them into a 1.25% solution of ethyl cellulose in benzene and air drying until the benzene was completely evaporated.

A second composition was prepared which was similar to the above with the exception that the ammonium citrate buffer was replaced with a sodium citrate buffer. The following testing procedure was then followed in determining blood urea nitrogen (BUN) levels with both compositions.

The coated ends of both strips were moistened with one drop sample of blood containing known concentrations of urea. After a two-minute incubation period at room temperature the blood was removed by washing with water. The developed colors of both series of strips were immediately compared to color standards which had been previously correlated to indicate the concentration of blood urea nitrogen present in the blood sample. The results obtained are tabulated in the table below.

TABLE

| | | Color chart readings in Conc. of BUN mg., percent | |
|---|---|---|---|
| Run | Known conc. BUN mg., percent | Ammonium citrate buffer | Sodium citrate buffer |
| 1 | 10.0 | 10 | 20 |
| 2 | 22.1 | 20 | 40 |
| 3 | 23.8 | 25 | 50 |
| 4 | 34.4 | 30 | 75− |
| 5 | 35.4 | 35 | 60 |
| 6 | 75.6 | 75 | 100 |
| 7 | 81.0 | 80 | 100 |
| 8 | 84.8 | 80 | 95 |
| 9 | 107.2 | 100 | 100 |
| 10 | 162.0 | 100+ | 100+ |

It can be seen that the results obtained with the composition containing sodium citrate as the buffer were erratic. On the other hand, the composition containing the ammonium citrate buffer was extremely sensitive particularly in the lower ranges and coincided very closely to the predetermined BUN concentrations.

EXAMPLE II

The procedure of Example I was repeated except that the ammonium citrate buffer was replaced with ammonium acetate. The results obtained were substantially the same as those obtained with an ammonium citrate buffer. In all instances, the amount of deviation from the actual urea nitrogen concentration was less than 10 percent.

EXAMPLE III

The procedure of Example I was repeated except that about 0.05 g. of tris(hydroxymethyl) aminomethane (TRIS) was added to the solution of ingredients and the ammonium citrate buffer omitted. Citric acid was used to adjust the pH of the solution to about 6.0. The results obtained were substantially the same as those obtained in Examples I and II.

In summary, this invention relates to an improved, highly sensitive test composition, device and method for the determination of urea in fluids utilizing an enzyme system having urease activity, an indicator system and a buffer capable of producing ammonium ions.

What is claimed is:

1. A test composition for detecting urea present in a test fluid which comprises sufficient urease for hydrolyzing the urea present in the fluid to ammonia and carbon dioxide thereby effecting a change in pH in the test fluid, a pH indicator chromogenically responsive to said change in pH in the test fluid and an ammonium ion producing buffer capable of releasing ammonium ions into the test fluid independently of said hydrolysis of urea into ammonia and carbon dioxide.

2. The composition of claim 1 wherein said ammonium ion producing buffer is selected from the group consisting of ammonium citrate, ammonium lactate, ammonium oxalate, ammonium benzoate, ammonium acetate, ammonium salicylate, ammonium stearate, ammonium propionate, ammonium butyrate, ammonium phosphate, tris (hydroxymethyl) aminomethane, 2-amino-2-methyl-1,3-propanediol, imidazole, 4-aminopyridine, 2-amino-2-methyl-1-propanol, hexamethylenediamine, substituted imidazoles, and acid salts thereof as well as mixtures of two or more such buffers.

3. A test composition as in claim 1 wherein the buffer is tris (hydroxymethyl) aminomethane.

4. A test device for detecting urea present in a test fluid which comprises a carrier member and the dry solids remaining after said carrier member is incorporated with a solution comprising sufficient urease for hydrolyzing the urea present in the fluid to ammonia and carbon dioxide thereby effecting a change in pH in the test fluid, a pH indicator chromogenically responsive to said change in pH in the test fluid and an ammonium ion producing buffer capable of releasing ammonium ions into the test fluid independently of said hydrolysis of urea into ammonia and carbon dioxide.

5. A test device as in claim 4 wherein the pH of said solution is between the midpoint of the transition interval of the indicator and a point adjacent to and on the acid side of the transition interval.

6. The test device of claim 4 wherein the carrier member is a bibulous cellulose paper strip.

7. The test device of claim 4 wherein the buffer is selected from the group consisting of ammonium citrate, ammonium lactate, ammonium oxalate, ammonium benzoate, ammonium acetate, ammonium salicylate, ammonium stearate, ammonium propionate, ammonium butyrate, ammonium phosphate, tris (hydroxymethyl) aminomethane, 2-amino-2-methyl-1,3-propanediol, imidazole, 4-aminopyridine, 2-amino-2-methyl-1-propanol, hexamethylenediamine, substituted imidazoles, and acid salts thereof as well as mixtures of two or more of such buffers.

8. A test device as in claim 4 wherein the buffer is tris (hydroxymethyl) aminomethane.

9. A test device as in claim 4 wherein the carrier member is coated with a semi-permeable polymeric film.

10. A method for detecting urea in a test fluid which comprises contacting the fluid which may contain urea with a test composition comprising sufficient urease for hydrolyzing the urea present in the fluid to ammonia and carbon dioxide thereby effecting a change in pH in the test fluid, a pH indicator chromogenically responsive to said change in pH in the test fluid and an ammonium ion producing buffer capable of releasing ammonium ions into the test fluid independently of said hydrolysis of urea into ammonia and carbon dioxide and observing the result thereby achieved.

11. A method as in claim 10 wherein the buffer is selected from the group consisting of ammonium citrate, ammonium lactate, ammonium oxalate, ammonium benzoate, ammonium acetate, ammonium salicylate, ammonium stearate, ammonium propionate, ammonium butyrate, ammonium phosphate, tris (hydroxymethyl) aminomethane, 2-amino-2-methyl-1,3-propanediol, imidazole, 4-aminopyridine, 2-amino-2-methyl-1-propanol, hexamethylenediamine, substituted imidazoles, and acid salts thereof as well as mixtures of two or more of such buffers.

12. A method as in claim 10 wherein the test composition is incorporated with a carrier member.

13. A method as in claim 10 wherein the carrier member is coated with a semi-permeable polymeric film and the method is utilized to detect urea in whole blood.

14. A method as in claim 13 which additionally comprises the step of washing the carrier member to remove the excess whole blood prior to reading the results obtained.

References Cited
UNITED STATES PATENTS

| | | | |
|---|---|---|---|
| 3,092,465 | 6/1963 | Adams et al. | 195—103.5 |
| 3,145,086 | 8/1964 | Free et al. | 195—103.5 |

ALVIN E. TANENHOLTZ, Primary Examiner

U.S. Cl. X.R.

148—191